United States Patent Office 3,407,188
Patented Oct. 22, 1968

3,407,188
QUATERNARY AMMONIUM SALTS OF LIGNIN
Giancarlo A. Cavagna, Charleston, S.C., assignor to West Virginia Pulp and Paper Company, New York, N.Y., a corporation of Delaware
No Drawing. Filed Sept. 1, 1965, Ser. No. 484,456
3 Claims. (Cl. 260—124)

ABSTRACT OF THE DISCLOSURE

Quaternary ammonium salts of lignin which are insoluble in aqueous solutions having a pH between 4 and 8 and soluble in aqueous solution below 4 and above 8 prepared by reacting a lignin amine made via the Mannich reaction with either an alkyl halide or an alkyl sulfate having utility as a dispersing or a flocculating agent.

---

This invention relates to quaternary ammonium salts of lignin.

It is the principal object of this invention to provide a new type of dispersant derived from lignin, said dispersant being the quaternary ammonium salt of lignin.

Other objects will become evident from the following disclosure.

The quaternary ammonium salts of this invention are easily prepared by reaction of lignin amines with an alkyl halide or sulfate according to procedures well known to the prior art. The lignin amine to be converted may be a primary, secondary, or tertiary amine. These lignin amines may be prepared by a number of methods known to the prior art. One very simple and easy method of preparing the lignin amine is via the Mannich reaction where the lignin is reacted with formaldehyde or equivalent aldehyde and a primary or secondary amine or ammonia. The manufacture of amines by this method is well shown in U.S. Patent 2,863,780 and in the referenced application of Ball et al. S.N. 643,511 filed Mar. 4, 1957, for Lignin Amines and the Preparation Thereof. Additional data on the reaction, particularly as regards conducting it in a non-aqueous solvent is also contained in U.S. Patent 2,709,696 to Wiest et al.

While there is a wide range of lignin amine products, differing in the type of lignin employed, type of aldehyde, and type of amine, all these can be easily and successfully employed in preparing quaternary ammonium salts of lignin.

In converting the lignin amine to the quaternary ammoninum salt, the lignin amine is dissolved in a suitable solvent, preferably an aqueous system having a pH above 8, and heated with an alkyl halide or alkyl sulfate.

The reaction has been found to proceed under ambient conditions of temperature, however, as would be expected the reaction proceeds much more readily at elevated temperatures and a temperature of about 40 to 60° C. is preferred.

The product of the reaction may be shown by the general formula:

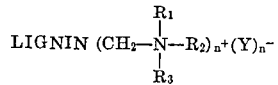

when $n$ is equal to between 0.5 and 2.6 per 1000 unit weight of lignin, Y is selected from the group consisting of chloride, bromide, iodide, and sulfate, and $R_1$, $R_2$, and $R_3$ are lower alkyl groups having one to four carbons.

The quantity of alkylating agent necessary to form the quaternary ammonium salt is dependant upon the type of lignin amine employed. To convert the primary amine will require 3 moles of alkylating agent per amine group to be converted, while the secondary amine will require 2 moles and the tertiary amine only one. To obtain maximum yields it is preferred practice to employ a slight excess (10 to 20%) of alkylating agent in the reaction mixture.

Alkylating agent having up to four carbons have been found to be satisfactory in producing the quaternary ammonium salt. Longer chain alkylating agents are extremely difficult to use due to excessively long reaction times required and greatly reduced conversion of the amine group to the quaternary salt. The preferred alkylating agents are consequently the $C_1$ through $C_4$ chlorides, bromides, iodides and sulfates.

In conducting the reaction in an aqueous system, it is desirable in order to obtain maximum yields that the pH of the system be maintained above 8 to maintain all components in solution. Although the reaction may begin at a high pH, during the course of the reaction a decided drop in pH of 1.5 to 3 units will occur. Unless the alkalinity is very high to begin with it may be necessary to periodically add alkali to maintain the pH above the 8 level. The reaction, however, proceeds even if the pH is not brought back to and above 8 although at the expense of complete conversion of the amine to the quaternary ammonium salt.

After the reaction has been carried to the desired degree, the quaternary ammonium salt can be easily recovered by decreasing the pH to the range of about 4 to 8. The quaternary salt will precipitate out and after filtering may be dried. Preferably, however, the solution is freeze or spray dried from solution at pH 9–10. The resultive product is readily soluble in water yielding an alkaline solution.

The quaternary ammonium salts of lignin are all soluble in aqueous alkali and acid solution having a pH below 4 and above 8. They are excellent dispersants particularly in systems where they are soluble. As will be shown in the examples, these salts are at least twice as effective in their dispersability as the amines from which they are prepared.

Quaternary ammonium salts can be prepared having from about 0.5 to 2.6 groups per 1000 unit weight of lignin. As the ability of these lignin materials to disperse other materials is directly related to the number of quaternary ammonium groups present per unit weight, the preferred products of this invention contain about 1.8 to 2.6 groups per 1000 unit weights of the original lignin or about 1.2 to 1.8 groups per 1000 unit weights of the finished quaternary ammonium salt of lignin. These products are very effective dispersing agents and find particular use in ore flotation, dispersion of pigments and as asphalt emulsifiers where they may be employed as anionic or cationic emulsifiers. Additionally, these products are highly effective flocculating agents.

The manufacture and utilization of quaternary ammonium salts of lignin may be best seen in the following examples.

Example I

An aqueous solution of methyl iodide was prepared by dissolving three parts by weight of methyl iodide in 250 parts by weight of water which had been heated to 40° C. A lignin amine solution containing 10 parts by weight of the lignin amine dissolved in 150 parts by weight of water was slowly added to the methyl iodide solution in a dropwise fashion while maintaining the temperature of the solution at 40° C. The pH of the final solution was about 10. The lignin amine employed was a tertiary amine which had been prepared by slurrying 53 parts by weight of kraft pine lignin in 123 parts of water, adding 3.8 parts by weight of sodium hydroxide thereby causing dissolution of the lignin, adding 14.6 parts by weight of dimethylamine and 10 parts by weight of 37% formaldehyde solution, heating the resultant solution to 55° C. for 1 hour and thereafter spray drying. The tertiary amine product was soluble in water yielding a solution having a pH of about 11 due to residual alkali. It was insoluble, however, in aqueous systems having a pH between 4 and 8, and soluble in aqueous acid below pH 4. The product contained 2.8% nitrogen indicating that 2 amine groups had been added per 1000 molecular weights units of lignin.

After one hour of heating with constant stirring the solution became cloudy due to reduction of the pH to 7.5 and precipitation of the quaternary salt at this pH. The pH was raised to about 9 and heating contained for three additional hours. The reaction mixture was freeze dried recovering the quaternary ammonium lignin salt in quantitive yield. This salt was found to contain 2% nitrogen and 15.27% iodine. The decrease in nitrogen content and the amount of iodine present both indicated complete conversion of the two amine groups to the quaternary ammonium salts.

Example II

The procedure of Example I was repeated except that the temperature was maintained at 20° C. and no attempt was made to maintain the pH above 8. After about an hour the pH had decreased so that the quaternary ammonium salt precipitated forming a turbid solution. The solution was maintained at 20° C. for 3 additional hours after which the quaternary salt was recovered by freeze drying. This product contained 2.1% nitrogen and 12.66% iodine indicating that only about 85% of the tertiary amine groups had been converted to the quaternary ammonium salt.

Example III

The process of Example I was repeated using a primary amine rather than a tertiary amine. The primary amine was prepared in a similar manner to that shown in Example I for the tertiary amine except that molal equivalent of ammonia were used in place of dimethylamine.

Due to the increased amount of methyl iodide required to convert the primary amine to the quaternary ammonium salt as compared to the tertiary amine, the quantity of lignin amine employed in this case was only 3 parts by weight as compared to the 10 parts by weight of the tertiary amine used in Example I. The product obtained was substantially identical to that obtained in Example I.

Example IV

The effectiveness of the lignin quaternary ammonium salt as a dispersant was compared to that of the original tertiary amine used in Example I. A slurry was made up with 80 grams of titanium dioxide pigment (approximate mean diameter 0.3 micron) and 50 ml. of 0.01 molar sodium chloride solution. Different quantities of lignin amine and lignin quaternary ammonium salt obtained from Example I was added. Conditions of pH (adjusted to 10 with sodium hydroxide as necessary), ionic strength of the slurry, and temperature (25° C.) were carefully maintained constant for all tests. By comparison of the quantity of amine or quaternary salt required to achieve the same viscosity reduction, relative dispersants efficiencies of the materials were obtained. The following table presents the viscosity data obtained.

WEIGHT OF MATERIAL ADDED, GR.

| Viscosity, cps. at 25° C. | Tertiary Amine | Quaternary Ammonium Salt |
|---|---|---|
| 1,550 | 0.0745 | 0.0375 |
| 1,350 | 0.1050 | 0.0510 |
| 1,220 | 0.1390 | 0.0690 |
| 1,050 | 0.1810 | 0.0925 |
| 900 | | |

From the preceding it will readily be seen that the quaternary ammonium salt of lignin is approximately twice as effective in its ability to disperse as the tertiary lignin amine. It might also be noted that the effectiveness of the quaternary ammonium salt of lignin in the above example could, on a weight basis, be increased by about 15% by formation of the molecularly lighter chloride salt rather than the iodide salt.

I claim:
1. A quaternary ammonium salt of lignin which is insoluble in aqueous solutions having a pH between 4 and 8 and soluble in aqueous acid and alkaline solutions having a pH below 4 and above 8 and which has the following structure:

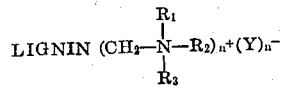

where $n$ is equal to between 0.5 and 2.6 per 1000 unit weight of lignin, Y is a radical selected from the group consisting of chloride, bromide, iodide, and sulfate, and $R_1$, $R_2$, and $R_3$ are lower alkyl groups having one to four carbons.

2. The lignin salt of claim 1 wherein $R_1$, $R_2$, and $R_3$ are methyl groups.

3. The lignin salt of claim 1 wherein $n$ is equal to at least 1.8.

References Cited

UNITED STATES PATENTS 2,709,696  5/1955  Wiest et al. ---------- 260—124

OTHER REFERENCES

Hess et al.: "Berichte," vol. 79, p. 1804 (1942).
Wagner and Zook, "Syn. Org. Chem." (1953), pp. 666–668.

CHARLES B. PARKER, *Primary Examiner*.

D. R. PHILLIPS, *Assistant Examiner*.